United States Patent
Kraus

[11] 3,835,974
[45] Sept. 17, 1974

[54] INTERNAL CLUTCH

[75] Inventor: Charles E. Kraus, Austin, Tex.

[73] Assignee: Excelermatic, Inc., Austin, Tex.

[22] Filed: Jan. 5, 1973

[21] Appl. No.: 321,293

[52] U.S. Cl. ............................ 192/87.15, 192/48.91
[51] Int. Cl. ............................................. F16d 19/00
[58] Field of Search........... 192/87.14, 87.15, 87.16, 192/48.91, 87.17

[56] References Cited
UNITED STATES PATENTS

| | | | |
|---|---|---|---|
| 2,967,597 | 1/1961 | Binder | 192/48.91 |
| 3,001,413 | 9/1961 | Burckhardt | 192/87.14 |
| 3,721,324 | 3/1973 | Schweizer | 192/48.91 |

Primary Examiner—Samuel Scott
Assistant Examiner—Wesley S. Ratliff, Jr.

[57] ABSTRACT

An internal clutch for coupling a rotatable disc with either one of rotatable annular members closely surrounding different portions of the disc, wherein a number of pistons are disposed in radial cylinders formed in each portion of the disc and means are provided for selectively forcing the pistons in either portion of the disc toward the respective annular member for frictional engagement thereof with the disc.

10 Claims, 3 Drawing Figures

PATENTED SEP 17 1974 3,835,974

INTERNAL CLUTCH

BACKGROUND OF THE INVENTION

There are basically three types of clutches for transmitting a torque by engagement of friction surfaces.

1. Disc-type clutches wherein the members to be engaged with each other are discs associated with means for forcing the discs in engagement with each other.

2. Cone-type clutches wherein the members to be engaged with each other have conical surfaces adapted to be forced in engagement with each other by axial movement of the members relative to each other, and 3. Rim or drum type clutches in which friction pads are supported for example by a disc and are forced in engagement with a drum surrounding the disc.

The rim or drum type clutches have the advantage that no axial forces are required for engagement or disengagement of the clutch but are usually quite complicated as one of the members must be provided with means for increasing or reducing its effective diameter.

There are centrifugal clutches of this type in use wherein centrifugally actuated friction pads mounted on a rotatable disc are forced in engagement with a drum, however, such arrangement has been good only for the transmission of relatively small torques since the forces available for causing engagement of the friction surfaces of the clutch are very limited.

SUMMARY OF THE INVENTION

An internal clutch is described wherein a rotatable disc is selectively coupled with either one of two annular members surrounding portions of the disc.

Each portion of the disc has essentially radial cylinder bores with pistons disposed therein. Means are provided for selectively forcing the pistons in either of the disc portions in frictional engagement with the respective annular member and, at the same time, for retracting the pistons in the other disc portion for coupling the disc with the respective annular member.

DESCRIPTION OF THE PREFERRED EMBODIMENT

Figure 1:
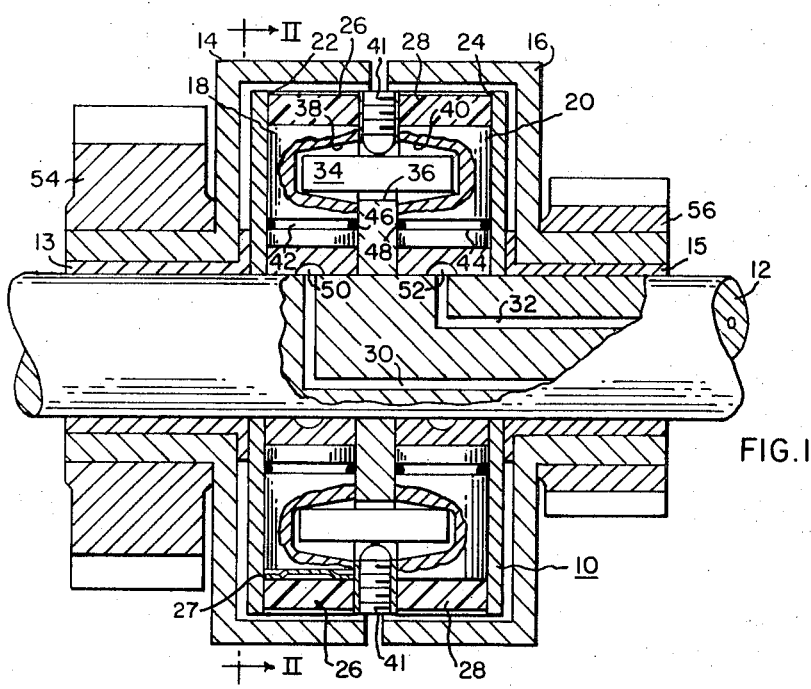
FIG. 1 is a cross-sectional view of the clutch showing the pistons in both disc sections disengaged from the annular members.

As shown in the drawings, the clutch includes a disc 10 mounted on a shaft 12 for rotation therewith, a first annular member 14 closely surrounding one part of the disc 10 and a second annular member 16 closely surrounding another part of the disc 10, the annular members being supported for rotation about the axis of the shaft 12 by bearings 13 and 15. The disc 10 has a plurality of pistons 18 and 20 disposed in radial cylinder bores 22 and 24 formed in the disc 10. The pistons 18 in the bores 22 in one part of the disc 10 are adapted to engage the first annular member 14 for frictional engagement with the disc 10 and the pistons 20 in the bores 24 in the other part of the disc 10 are adapted to engage the second annular member 16. To facilitate such frictional engagement, the pistons 18 and 20 have friction pads 26 and 28 disposed at their radially outer faces. Pressurized fluid supply passages 30 and 32 extend through the shaft 12 to the bores 22 and 24, respectively, for selectively forcing the pistons 18 and 20 in engagement with the first or second annular member, respectively.

Preferably, a pivot bar 34 extends through an opening 36 in the disc 10 and with its opposite ends into cavities 38 and 40 formed in adjacent pistons 18 and 20 of different disc portions and is pivotably supported in the opening 36 by a radial adjusting screw 41 such that radial outward movement of one piston causes the other piston to move radially inwardly. This insures that only one of the annular members 14 and 16 can be in engagement with the disc 10 and, furthermore, balances the centrifugal forces effective on the pistons 18 and 20 during rotation of the disc 10. The opening 36 is actually a radial slot in the wall between the cylinders 22 and 24 to permit installation of the pivot bar 34 together with the pistons 18 and 20.

The pistons 18 and 20 have circumferential grooves 42 and 44 with sealing rings 46 and 48 disposed in the grooves 42 and 44, respectively. Annular grooves 50 and 52 are formed in the disc 10 to provide communication among all cylinder bores 22 in one part of the disc 10 and all cylinder bores 24 in the other part of the disc 10 for simultaneous engagement of the pistons with, or disengagement from, the respective annular members 14 and 16.

As indicated in FIG. 1, the annular members 14 and 16 may be provided with gears 54 and 56 for connection of the clutch in a drive train. However, other arrangements are possible, for example, direct connection of the annular members with part of a transmission as shown in this applicant's co-pending application Ser. No. 321,452, filed Jan. 5, 1973, now U.S. Pat. No. 3,820,416.

Figure 2:
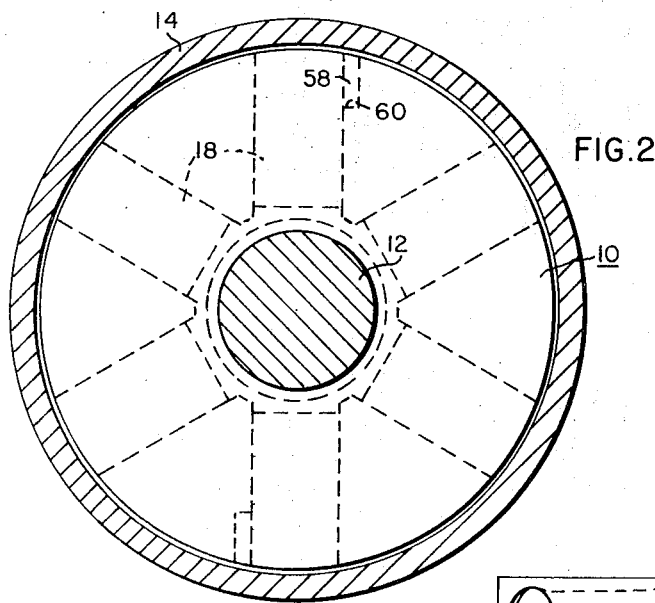
FIG. 2 is a cross-sectional view along lines II—II of FIG. 1.
Figure 3:
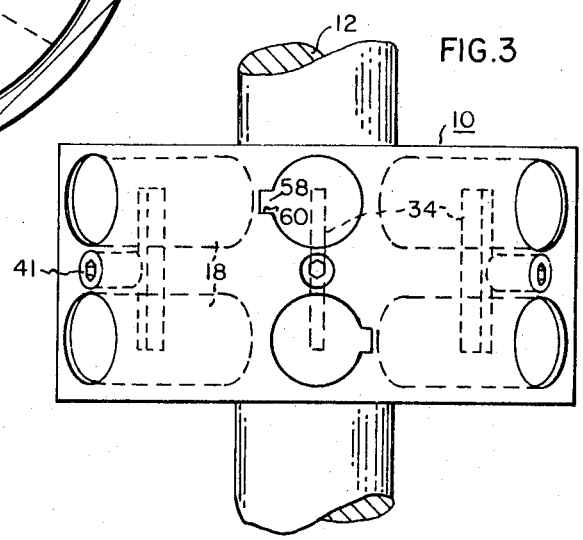
FIG. 3 shows the disc with the annular members removed.

As shown in FIGS. 2 and 3, there are six pairs of cylinders 22, 24 and pistons 18, 20 arranged in the discs 10; however, six pairs of cylinders are given only as an example. Larger clutches will usually employ a larger number of cylinders and pistons.

As shown in FIG. 2, the radially outer surfaces of the pistons and the friction pads are curved to fit the inner surface of the annular members 14 and 16. Rotation of the pistons is prevented as by keys 58 associated with the pistons and extending into radial grooves 60 formed in the walls of the cylinder bores 22 and 24.

As pointed out earlier, the clutch arrangement as described permits operative connection of the shaft 12 either to the gear 54 or the gear 56: If pressurized fluid is supplied through the passage 30 to the cylinders 22 the pistons 18 are forced into engagement with the annular member 14 while the pistons 20 are forced away from the annular member 16 and if pressurized fluid is supplied through the passage 32 to the cylinders 24, the pistons 20 are forced into engagement with the annular member 16 while the pistons 18 are retracted by the pivot bars 34.

Preferably means are provided to cause smooth engagement between the pistons 18 and 20 and the annular members 14 and 16. Such means may be associated with the hydraulic fluid supply and adapted to cause an only gradual pressure buildup in the radial cylinders 22 and 24 to permit initial slippage during engagement of the clutch, but preferably such means simply are in the form of springs such as Belleville type springs disposed between the pistons 18 and 20 and the friction pads 26 and 28, the friction pads being movable relative to the pistons, a spring 27 being shown for friction pad 26.

The pivot bars 34 as shown in the drawings represent convenient and inexpensive means for balancing centrifugal forces and forcing adjacent pistons to move in opposite directions. However, other means may be employed as, for example, gears supported between and engaging each of two adjacent pistons. Furthermore, the radially adjustable screw 41 is shown as an example for any kind of radially adjustable fulcrum for the pivot bars 34.

It is also noted that rotation of the pistons can be prevented solely by the pivot bars if the cavity in the pistons and the pivot bars are formed to cooperate to serve this purpose.

The clutch according to the invention is very simple as it consists of only a few basic parts which are easy to manufacture and easy to assemble. It can be employed with particular advantage where a source of a pressurized operating fluid is available as, for example, in automatic transmissions.

What is claimed is:

1. In an internal frictional clutch comprising a shaft, a disc mounted on said shaft for rotation therewith and having at least a first and a second portion, a rotable first annular member closely surrounding the first portion of said disc and a second annular member closely surrounding the second portion of said disc, the combination of a number of pistons disposed in cylinders arranged in radial symmetry in each portion of said disc, each of said pistons having a friction surface disposed adjacent the inner surface of the respective annular member, balancing means interconnecting adjacent pistons in different disc portions for causing simultaneous movement of said interconnected pistons only in opposite directions, and means for selectively pressurizing the cylinders in either portion of said disc for forcing the pistons in the corresponding portion of said disc toward the respective annular member for frictional engagement thereof with said disc.

2. A clutch as recited in claim 1, wherein said balancing means is a bar pivotally supported in an opening in the disc between adjacent cylinders in opposite disc portions and extending into cavities formed in the pistons disposed in said adjacent cylinders.

3. A clutch as recited in claim 2, wherein said bar is supported in said opening by a radially adjustable fulcrum.

4. A clutch as recited in claim 3, wherein said radially adjustable fulcrums are formed by radial screws supported in said disc.

5. A clutch as recited in claim 1, wherein fluid supply passages extend through said shaft and lead to the cylinders in the one and, respectively, the other disc portion and an annular passage is formed in each disc portion to interconnect the cylinders in said disc portions to permit simultaneous pressurization of all the cylinders in one of said disc portions.

6. A clutch as recited in claim 1, wherein the radially outer end of each piston is curved to conform in shape with the adjacent annular member.

7. A clutch as recited in claim 1, wherein means are associated with each of said pistons for preventing rotation thereof.

8. A clutch as recited in claim 1, wherein friction pads are disposed on the radially outer faces of said pistons for firm engagement with the respective annular members.

9. A clutch as recited in claim 1, wherein means are provided for gradually increasing the friction between the pistons and the respective annular members while they are brought into engagement with each other.

10. A clutch as recited in claim 8, wherein springs are disposed between the pistons and the respective friction pads.

* * * * *